United States Patent
Dyahadray et al.

(10) Patent No.: US 10,019,203 B1
(45) Date of Patent: Jul. 10, 2018

(54) METHOD AND SYSTEM FOR PROCESSING WRITE REQUESTS

(71) Applicant: QLOGIC, Corporation, Aliso Viejo, CA (US)

(72) Inventors: Ashwini Dyahadray, Sunnyvale, CA (US); Deepak Tawri, Pune (IN)

(73) Assignee: Cavium, Inc., San Jose, CA (US)

(*) Notice: Subject to any disclaimer, the term of this patent is extended or adjusted under 35 U.S.C. 154(b) by 1366 days.

(21) Appl. No.: 13/906,207

(22) Filed: May 30, 2013

(51) Int. Cl.
*G06F 15/167* (2006.01)
*G06F 3/06* (2006.01)

(52) U.S. Cl.
CPC ......... *G06F 3/0674* (2013.01); *G06F 3/0608* (2013.01); *G06F 3/0664* (2013.01); *G06F 3/0665* (2013.01)

(58) Field of Classification Search
CPC .... G06F 3/067; G06F 12/0246; G06F 3/0659; G06F 3/0608; G06F 3/0653; G06F 3/0673; G06F 3/0658; G06F 3/0671; H04L 67/1097; H04L 49/90; H04L 67/2842; Y02B 60/1246
USPC ........................................................ 709/212
See application file for complete search history.

(56) References Cited

U.S. PATENT DOCUMENTS

| | | | | |
|---|---|---|---|---|
| 5,204,950 A * | 4/1993 | Kawashima | .......... | G06F 13/126 710/1 |
| 5,333,277 A * | 7/1994 | Searls | ................... | G06F 3/0601 710/300 |
| 6,393,535 B1 * | 5/2002 | Burton | .................. | G06F 3/0613 711/154 |
| 6,490,659 B1 * | 12/2002 | McKean | ............. | G06F 11/1441 711/113 |
| 6,493,750 B1 * | 12/2002 | Mathew | ................ | G06F 13/387 709/200 |
| 6,643,795 B1 * | 11/2003 | Sicola | ................. | G06F 11/2069 714/11 |
| 7,310,713 B2 * | 12/2007 | Eguchi | .................. | G06F 3/0605 707/999.202 |
| 7,539,790 B1 * | 5/2009 | Cameron | ............ | G06F 13/4221 710/22 |
| 7,565,502 B2 * | 7/2009 | Umemura | ............. | G06F 3/0605 711/100 |
| 7,707,304 B1 * | 4/2010 | Lolayekar | ............... | H04L 47/10 709/232 |
| 7,778,157 B1 * | 8/2010 | Tawri | .................. | G06F 11/2005 370/216 |

(Continued)

Primary Examiner — Yves Dalencourt
(74) Attorney, Agent, or Firm — Klein, O'Neill & Singh, LLP (57) ABSTRACT

Machine implemented methods and systems for writing data at a storage device are provided. A write command from an initiator adapter is received at a target adapter interfacing with a target controller for writing data to the storage device; where the write command includes information regarding a virtual logical unit number (LUN) for writing data in response to the write command. The target controller uses an indicator to notify the target adapter to process the write command and provides information regarding a designated LUN for the storage device where data is to be written at the storage device in response to the write command. Thereafter, the target adapter sends a response to the initiator adapter that it is ready to receive data and issues a write command for the storage device at the same time.

19 Claims, 5 Drawing Sheets

(56) References Cited

U.S. PATENT DOCUMENTS

| | | | | |
|---|---|---|---|---|
| 8,060,759 B1* | 11/2011 | Arnan | G06F 1/3203 | 711/114 |
| 8,463,941 B1* | 6/2013 | Welch | H04L 67/1097 | 709/238 |
| 8,468,319 B1* | 6/2013 | Satran | G06F 3/0611 | 711/111 |
| 9,218,278 B2* | 12/2015 | Talagala | G06F 12/0246 | |
| 9,229,854 B1* | 1/2016 | Kuzmin | G06F 12/0246 | |
| 9,280,469 B1* | 3/2016 | Kuang | G06F 12/0815 | |
| 2003/0028731 A1* | 2/2003 | Spiers | H04L 49/90 | 711/147 |
| 2003/0131068 A1* | 7/2003 | Hoshino | G06F 3/0613 | 709/216 |
| 2003/0140210 A1* | 7/2003 | Testardi | G06F 3/0601 | 711/203 |
| 2004/0078630 A1* | 4/2004 | Niles | G06F 3/0623 | 714/5.11 |
| 2005/0066118 A1* | 3/2005 | Perry | G06F 11/1469 | 711/112 |
| 2005/0147132 A1* | 7/2005 | Asako | G06F 11/2005 | 370/537 |
| 2005/0204078 A1* | 9/2005 | Steinmetz | G06F 3/0611 | 710/38 |
| 2006/0036821 A1* | 2/2006 | Frey | H04L 41/00 | 711/162 |
| 2006/0064550 A1* | 3/2006 | Katsuragi | G06F 3/0605 | 711/141 |
| 2006/0107016 A1* | 5/2006 | Murotani | G06F 3/061 | 711/170 |
| 2007/0094402 A1* | 4/2007 | Stevenson | H04L 29/08846 | 709/229 |
| 2007/0233973 A1* | 10/2007 | Uno | G06F 13/409 | 711/154 |
| 2007/0239944 A1* | 10/2007 | Rupanagunta | G06F 3/0613 | 711/147 |
| 2007/0266203 A1* | 11/2007 | Amano | G06F 11/1456 | 711/111 |
| 2007/0266204 A1* | 11/2007 | Mizuno | G06F 3/0613 | 711/111 |
| 2008/0016275 A1* | 1/2008 | Sebastian | G06F 3/0613 | 711/114 |
| 2008/0294843 A1* | 11/2008 | Atluri | G06F 3/065 | 711/114 |
| 2009/0106585 A1* | 4/2009 | Kitamura | G06F 11/1076 | 714/6.13 |
| 2009/0172257 A1* | 7/2009 | Prins | G06F 13/1657 | 711/103 |
| 2009/0234982 A1* | 9/2009 | Li | G06F 3/0605 | 710/19 |
| 2010/0169452 A1* | 7/2010 | Atluri | H04L 12/413 | 709/215 |
| 2010/0169661 A1* | 7/2010 | Summers | G06F 21/72 | 713/189 |
| 2010/0186014 A1* | 7/2010 | Vaghani | G06F 3/06 | 718/101 |
| 2011/0161554 A1* | 6/2011 | Selinger | G06F 13/1668 | 711/103 |
| 2011/0191520 A1* | 8/2011 | Kano | G06F 3/0613 | 711/102 |
| 2011/0202650 A1* | 8/2011 | Abraham | H04L 43/026 | 709/224 |
| 2011/0258376 A1* | 10/2011 | Young | G06F 12/0804 | 711/113 |
| 2011/0307659 A1* | 12/2011 | Hans | G06F 3/0613 | 711/114 |
| 2012/0005668 A1* | 1/2012 | Serizawa | G06F 12/0866 | 718/1 |
| 2012/0059978 A1* | 3/2012 | Rosenband | G06F 3/0613 | 711/103 |
| 2012/0144115 A1* | 6/2012 | Mitsuzumi | G11B 27/002 | 711/115 |
| 2012/0278664 A1* | 11/2012 | Kazui | G06F 12/0246 | 714/48 |
| 2012/0311231 A1* | 12/2012 | Porterfield | G11C 16/06 | 711/103 |
| 2013/0138909 A1* | 5/2013 | Yoshida | G06F 3/061 | 711/165 |
| 2013/0138916 A1* | 5/2013 | Ohara | G06F 11/1456 | 711/217 |
| 2014/0019677 A1* | 1/2014 | Chang | G06F 12/0804 | 711/105 |
| 2014/0173017 A1* | 6/2014 | Takagi | H04L 67/06 | 709/213 |
| 2014/0189273 A1* | 7/2014 | Orschel | G06F 12/1009 | 711/162 |
| 2014/0195564 A1* | 7/2014 | Talagala | G06F 12/0804 | 707/802 |
| 2015/0227431 A1* | 8/2015 | Fiske | G06F 11/1471 | 711/162 |

\* cited by examiner

| Ethernet Header 402 | FCOE Header 404 | SOF 406 | FC Header 408 | Pay Load 410 | FC CRC 412 | EOF 414 | Ethernet FCS 416 |

| Word/Bits | FC Header 408 ||||
|---|---|---|---|---|
|  | 31        24 | 23        16 | 15        08 | 07        00 |
|  | R_CTL 408C | D_ID | | 408A |
|  | CS_CTL 408K | S_ID | | 408B |
|  | Type 408J | F_CTL | | 408D |
|  | SEQ_ID 408E | DF_CTL 408L | SEQ_CNT | 408F |
|  | OX_ID 408G | | RX_ID | 408H |
|  | Parameter | | | 408M |

FIG. 4C

METHOD AND SYSTEM FOR PROCESSING WRITE REQUESTS

TECHNICAL FIELD

The present disclosure relates to computing systems and devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others.

Initiators are used to send input/output (I/O) requests for storing or reading data at storage devices that are managed by a computing system, typically referred to as a target controller. An initiator may be an adapter coupled to a computing system that sends out I/O requests for reading or writing data. A target may be an adapter coupled to the target controller that provides a response to the I/O request. Various transport protocols, for example, Fibre Channel, Fibre Channel over Ethernet, iSCSI (Internet over Small Computer System Interface) and others may be used for sending I/O requests. For processing I/O requests, information is typically sent and received by network devices as frames or packets, depending on the protocol used. Continuous efforts are being made to efficiently process I/O requests for reading and writing data.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for writing data at a storage device is provided. The method includes receiving a write command from an initiator adapter at a target adapter interfacing with a target controller for writing data to the storage device; where the write command includes information regarding a virtual logical unit number (LUN) for writing data in response to the write command. The target controller uses an indicator to notify the target adapter to process the write command and provides information regarding a designated LUN for the storage device where data is to be written at the storage device in response to the write command. Thereafter, the target adapter sends a response to the initiator adapter that it is ready to receive data and issues a write command for the storage device at the same time.

In another embodiment, a system for writing data at a storage device is provided. The system includes a host computing system coupled to an initiator adapter; and a target adapter interfacing with a target controller for writing data to the storage device. The target adapter receives a write command from the initiator adapter that includes information regarding a virtual logical unit number (LUN) for writing data. The target controller using an indicator notifies the target adapter to process the write command and provides information regarding a designated LUN for the storage device where data is to be written at the storage device in response to the write command. The target adapter sends a response to the initiator adapter that it is ready to receive data and simultaneously issues a write command for the storage device at the same time; receives data from the initiator adapter and a response from the storage device that the storage device is ready to write the data; and then transfers the received data to the target controller while simultaneously sending the data to the storage device; and sending a completion message to the initiator adapter.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
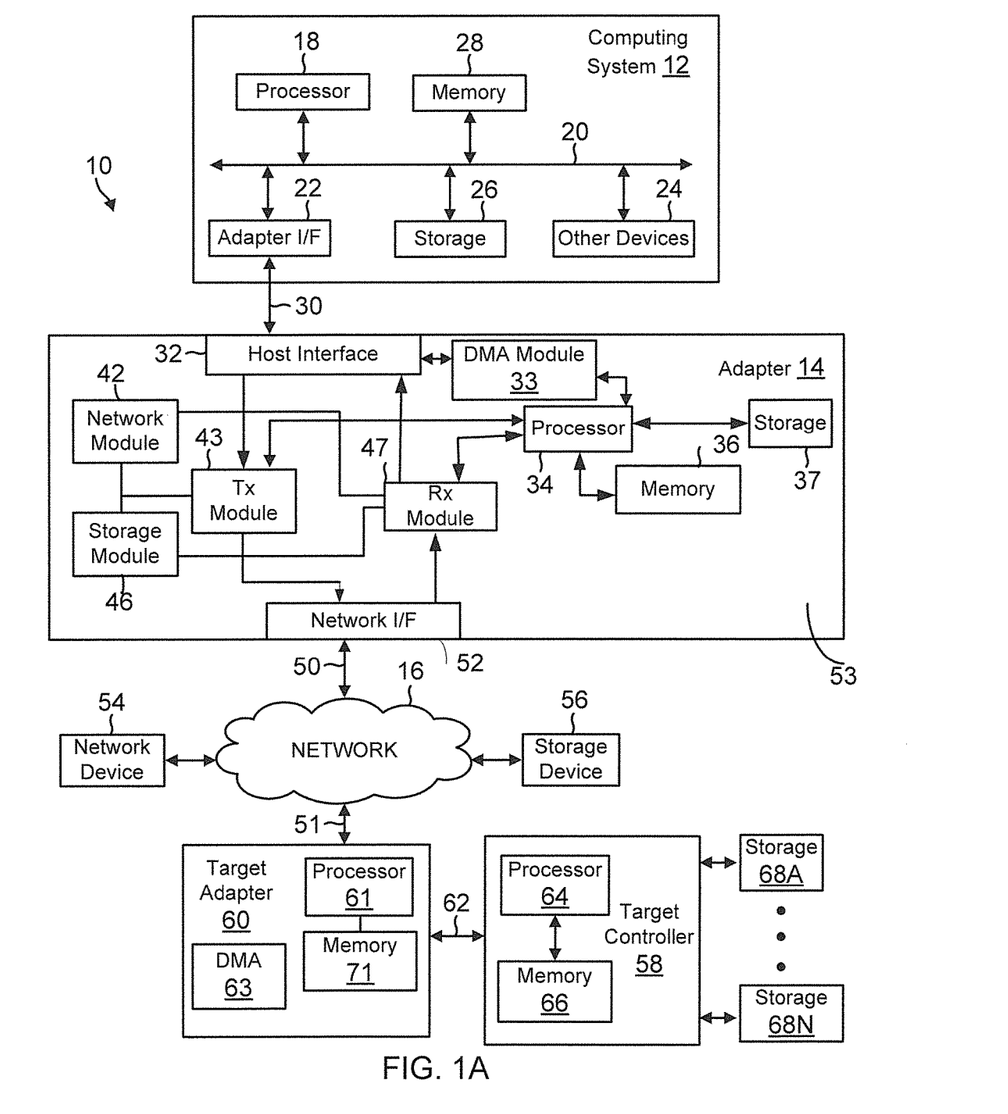
FIG. 1A is a system diagram showing components using the embodiments of the present disclosure.

System 10: FIG. 1A is a block diagram of a system 10 configured for use with the present embodiments. The system 10 may include one or more computing systems 12 (may also be referred to as "host system 12" or server 12) coupled to an adapter 14 (may also be referred to as initiator adapter 14) that interfaces with a network 16. The network 16 may include, for example, additional computing systems, servers, storage systems, etc.

The computing system 12 may include one or more processors 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 may further include a local storage device 26, which may be for example a hard disk, a CD-ROM, a non-volatile memory device (flash or memory stick) or any other device. Storage 26 may store operating system program files, application program files, and other files. Some of these files are stored at storage 26 using an installation program. For example, the processor 18 may execute computer-executable process steps of an installation program so that the processor 18 can properly execute the application program. The computing system 12 also includes other devices and interfaces 24, which may include a display device interface, a keyboard interface, a pointing device interface and others.

The adapter 14 may be configured to handle both network and storage traffic. Various network and storage technologies may be used to handle network and storage traffic. Some common protocols and network technologies are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 100 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage networking technology used to access storage systems is called Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_Port establishes a connection to a Fabric element (e.g., a switch) having a fabric port or F_Port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14. QLogic Corporation, the assignee of the present application, provides one such adapter. The illustrated adapter 14, however, does not limit the scope of the present embodiments. The present embodiments may be practiced with adapters having different configurations.

Input/Output (I/O) operations to read data from a storage device and write data to the storage device are typically based on a client/server model. Typically, the client is a host computing system such as a file server that issues a read or a write command for a target using an adapter. The target may be a storage array that responds to the client request.

The following introduces some of the basic terms used during an I/O operation: (a) "Exchange" means the operations needed to perform a data read or write and is uniquely identified by an exchange identifier. An exchange typically includes three operational phases: command phase, data movement phase and response phase. (b) "Initiator": Typically the client is the initiator that initiates a read or write command. (c) "Target": Typically a storage array that accepts a read or write command and then performs the requested operation.

In a typical I/O exchange, an initiator sends a "read" or "write" command to a target. For a read operation, the target sends the requested data to the initiator. For a write command, the target sends a "Ready to Transfer (XFER_RDY) Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete.

With continued reference to FIG. 1A, computing system 12 includes an adapter interface 22 that couples computing system 12 to the adapter 14 via a link 30. The adapter 14 interfaces with the computing system 12 via the link 30 and a host interface 32. In one embodiment, the host interface 32 may be a PCI Express interface coupled to a PCI Express link (for example, 30).

The adapter 14 may include a processor 34 that executes firmware instructions out of memory 36 to control overall adapter 14 operations. Direct memory access (DMA) module 33 may be used by adapter 14 to control access to link 30 for performing DMA operations, e.g. to send data to processor 18 memory 28 or receive data from processor 18 memory 28.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic to and from network device 54 via a link 50. In one embodiment, the network module 42 includes logic and circuitry for handling network packets, for example, Ethernet or any other type of network packets.

The adapter 14 may also include a storage module 46 for handling storage traffic to and from storage devices 56 and 68A-68N. In one embodiment, the storage module 46 is configured to process storage traffic according to the Fibre Channel storage protocol, or any other protocol, for example, iSCSI.

The adaptive embodiments of the present disclosure are not limited to adapter 14 having both and separate network and storage modules. For example, adapter 14 may have an integrated module that can handle either network and storage traffic, or adapter 14 may only have a storage module similar to a host bus adapter or a network module The adapter 14 also includes a network interface 52 that interfaces with a link 50 via one or more ports (not shown). The network interface 52 includes logic and circuitry to receive information via the link 50 and pass it to either the network module 42 or the storage module 46.

In one embodiment, adapter 14 includes a transmit (Tx) module 43 for transmitting information from adapter 14 to other devices via link 50. The transmit module 43 may be used by the network module 42 and/or storage module 46. In another embodiment, the storage and network module may have dedicated transmit modules.

The adapter 14 also includes a receive (Rx) module 47 for receiving and processing frames that are received via network link 50. The frames may be received complying with the Fibre Channel protocol, FCoE protocol or any other protocol type that is supported by adapter 14.

Adapter 14 may operate as an "initiator" for sending out I/O requests to a target controller 58 via a target adapter 60. The target adapter 60 is similar to the initiator adapter 14 and includes a processor 61 that has access to memory 71 that may be used to store firmware instructions or any other instruction. Target adapter 60 is coupled to network 16 via a link 51 similar to link 50. Target adapter 60 is coupled to the target controller 58 via a link 62 similar to link 30 described above. Target adapter 60 also includes a DMA module 63 that manages access to link 62 to send and receive data using DMA transfer operations. Target controller 58 may be a computing system similar to computing system 12 having a processor 64 and a memory 66. Target controller 58 manages storage devices 68A-68N for reading and writing data for I/O requests from computing system 12 sent via the initiator adapter 14.

Figure 1B:
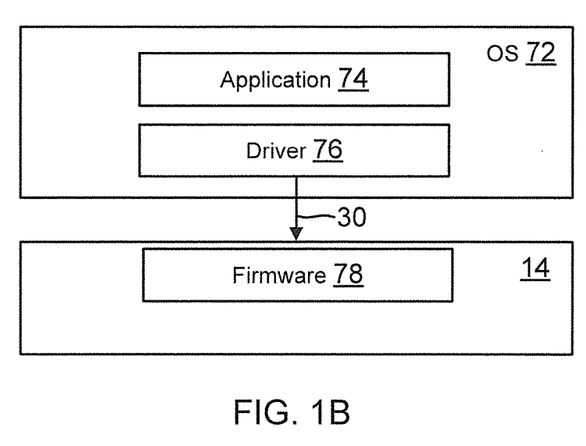
FIG. 1B is a block diagram showing an architecture used by an initiator system, used according to one embodiment.

FIG. 1B shows a block diagram of an architecture that may be used by or with the initiator components of system 10. For example, the architecture of FIG. 1B includes an operating system (OS) 72 that controls the overall operation of computing system 12. OS 72 may be Windows based, Linux based, Solaris based or any other OS type.

Application 74 when executed by computing system 12 may be a client application, for example, a database application, web server, e-mail application, and others. Application 74 may be used to generate a request to read and write information at storage devices 68A-68N.

Application 74 may also be a management application executed by a computing system used as a management console (not shown) for managing the various components in system 10. In one embodiment, application 74 may be used to configure a storage space at storage devices 68A-68N as a logical entity (logical unit number (LUN). Each LUN is uniquely identified by an identifier (LUN ID) and is associated with (or mapped to) physical storage space. A LUN is typically divided into logical block addresses (LBAs) that are used by an application to read and write data to storage locations. The LBAs are mapped with actual physical storage to read and write data. To generate an I/O request to read or write data at a storage location, initiator adapter 14 uses a LUN identifier and a LBA range.

To communicate with adapter 14, application 74 uses a driver 76. The driver may be referred to as an adapter driver. To control the operations of adapter 14, an adapter processor executes firmware instructions 78 out of adapter memory. In one embodiment, some of the process steps may be executed by firmware 78.

Figure 1C:
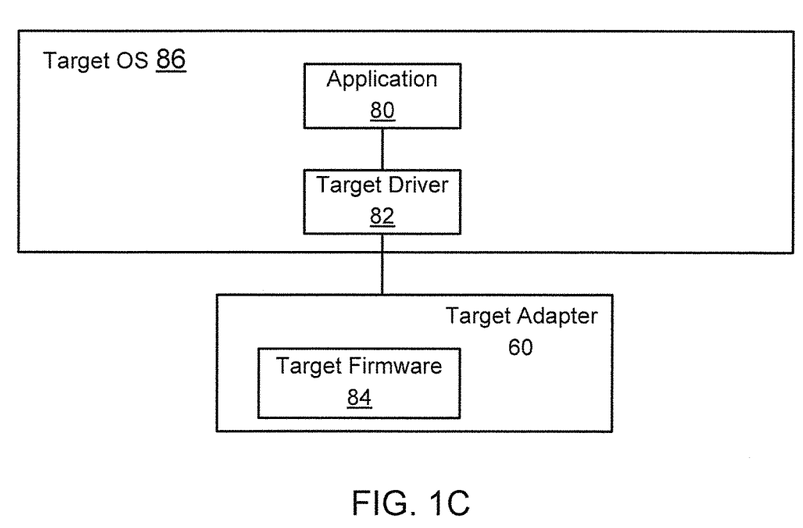
FIG. 1C is a block diagram showing an architecture used by a target system, used according to one embodiment.

FIG. 1C shows a block diagram of an architecture used by the target side of system 10 of FIG. 1A. For example, the architecture of FIG. 1C includes a target operating system 86 similar to 72 that controls the overall operation of target controller 58. OS 72 may be Windows based, Linux based, Solaris based or any other OS type. Target controller 58 may execute an application 80, similar to application 74 that is described above.

To communicate with target adapter 60, application 80 uses a target driver 82, similar to driver 76. To control the operations of target adapter 60, an adapter processor executes firmware instructions 84 (similar to firmware 78) out of target adapter memory. In one embodiment, some of the process steps may be executed by firmware 84.

Figure 2:
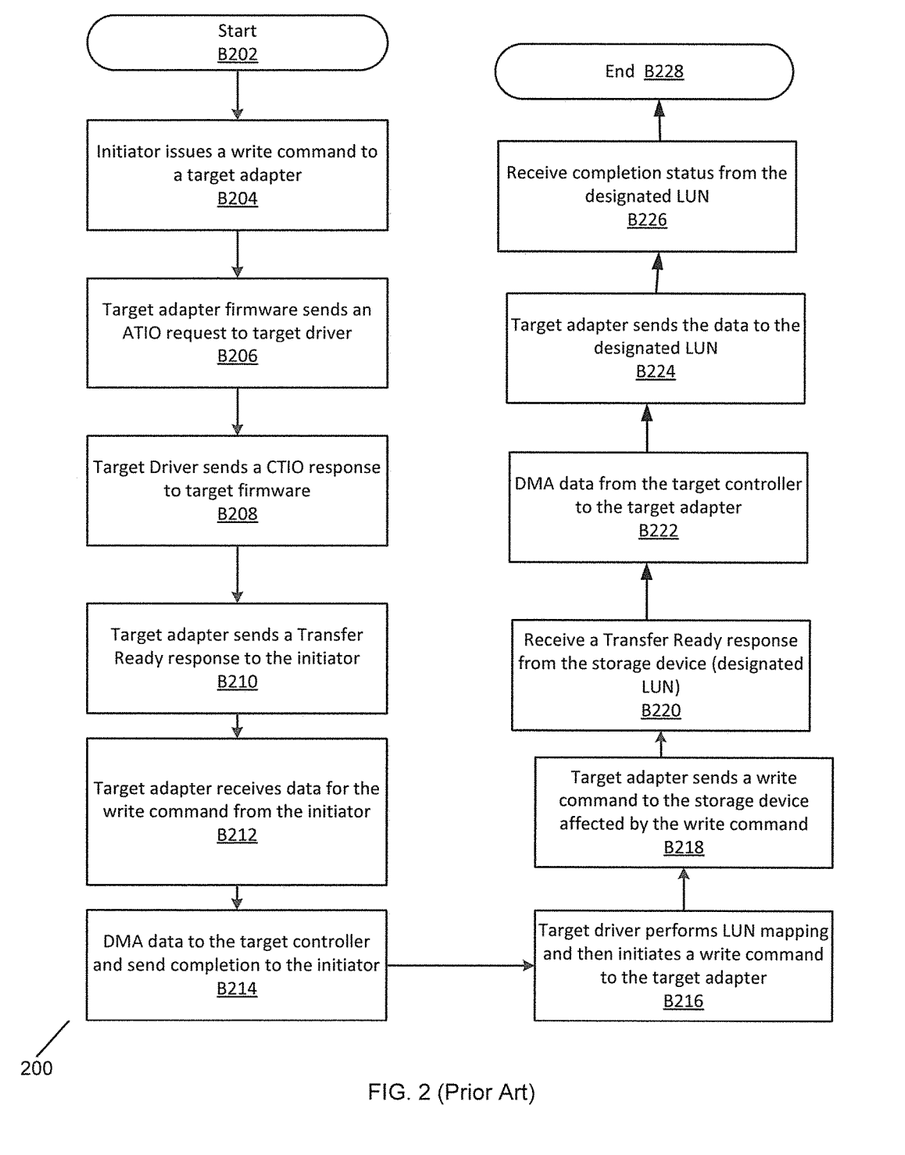
FIG. 2 shows a conventional process for handling write commands.

FIG. 2 shows a conventional process 200 for handling a typical SCSI write request. The process begins in block B202, when the initiator adapter 14 and the target adapter 60 are all operational. Application 74 sends a write request to write data to a LUN. The driver 76 generates an IOCB (Input/Output Control Block) for the write request. The IOCB is obtained by initiator adapter 14 and then the initiator adapter 14 issues a write command to the target adapter 60 in block B204. The command may be issued using the FCoE or any other protocol.

In block B206, the target adapter 60 sends an accept target (ATIO) request to the target driver 82. In response, in block B208, the target driver 82 sends a continue target I/O (CTIO) response to the target adapter firmware 84 to send a transfer ready (XFER_RDY) response to the initiator adapter 14. The CTIO response has information for an address-length pairs where data needs to be DMAed.

In block B210, the target adapter 60 sends the XFER_RDY command to the initiator adapter 14. In block B212, the target adapter 60 receives the data for the write command from the initiator adapter 14.

In block B214, the target adapter 60 sends the data to the target controller via a DMA operation and also sends a completion response to the initiator 14. In block B216, the target driver 82 performs a mapping operation to map the virtual LUN information in the IOCB to a physical LUN for the data that is sent by the initiator adapter 14. The target driver 82 then initiates a write command for the target adapter 60. In block B218, the target adapter 60 sends a write command to the storage device where data is to be written. In block B220, the target adapter 60 receives a XFER_RDY response from the storage device. In block B222, data from the target controller is sent to the target adapter 60 via another DMA operation. In block B224, the target adapter 60 sends the data to the storage device. The storage device stores the data at the appropriate location and then in block B226, a completion is sent to the target adapter 60 from the designated LUN. The process then ends in block B228.

Process 200 has shortcomings. For example, the target adapter has to initiate a new write command in response to the write command from the initiator adapter. To execute the write command, the target adapter also has to DMA the data twice, once to the target controller and then from the target controller. This uses computing resources both at the target controller and the target adapter. The embodiments described herein reduce this overhead and improve the overall efficiency of writing data in system 10.

Figure 3:
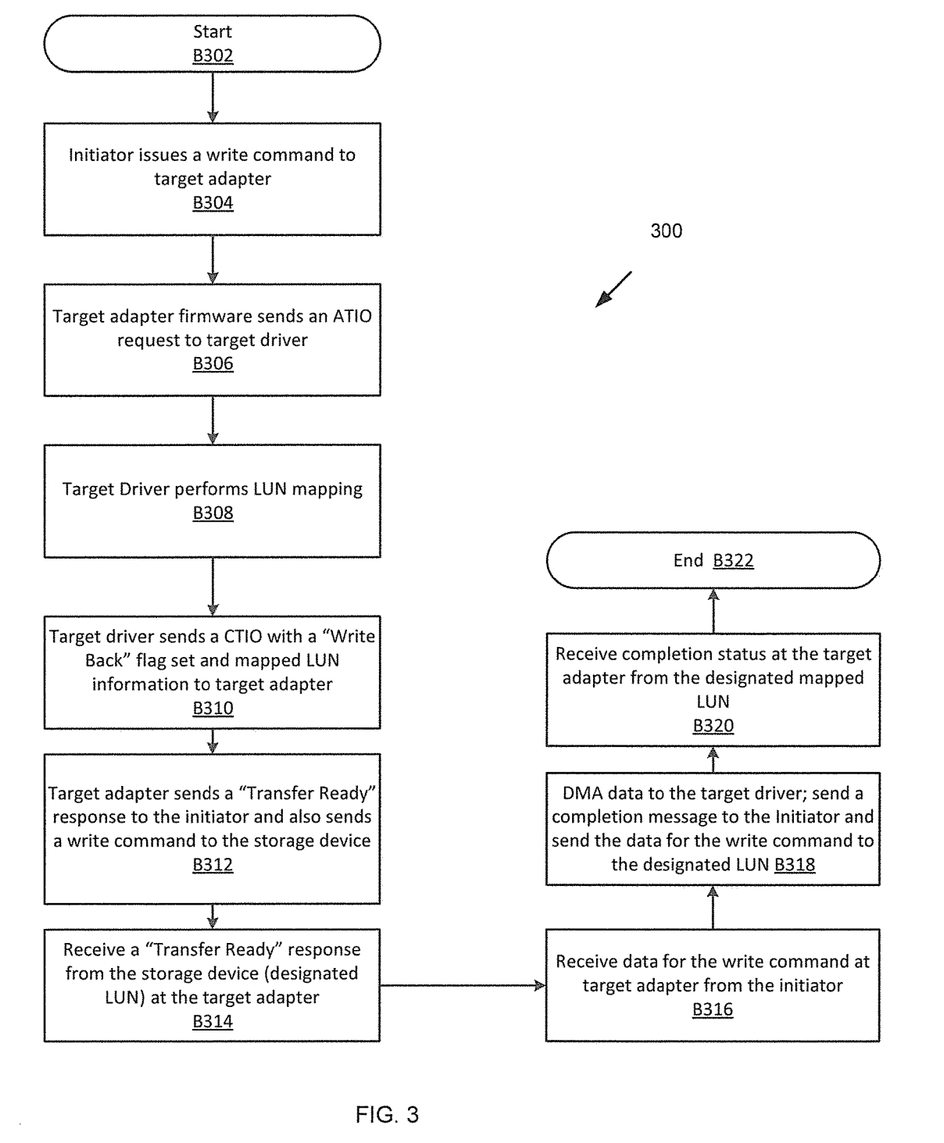
FIG. 3 shows a process flow diagram for a write command, according to one embodiment.

FIG. 3 describes a process 300 for handling a SCSI write request, according to one embodiment. The process begins in block B302, when the initiator adapter 14 and the target adapter 60 are all operational. Application 74 sends a write request to write data to a LUN. The driver 76 generates an IOCB for the write request and places it at memory 28. The IOCB identifies the LUN (or a virtual LUN) to which data is to be written. The IOCB is obtained by initiator adapter 14 and stored at memory 36. Based on the IOCB, in block B304, the initiator adapter 14 issues a write command to the target adapter 60. The command may be issued using the FCoE or any other protocol.

In block B306, the target adapter 60 sends an ATIO request to the target driver 82. In block B308, the target driver 82 performs translation for mapping the LUN in the IOCB to a storage LUN. The mapping information to map the LUN information from the IOCB to the physical LUN may be stored at a data structure at the target adapter 60 or any other location.

In block B310, the target driver 82 sends a CTIO response to the target adapter firmware 84. The CTIO response includes a flag, referred to as a "write back" flag and the designated LUN information based on the translation performed by the target driver 82. The use of the write back flag is described below in detail.

In block B312, after receiving the CTIO with the write back flag, the target adapter 60 sends a XFER_RDY response to the initiator adapter 14 and also sends a write command to the storage device for the designated LUN. The target adapter 60 sends the write command based on the write back flag.

In block B314, the target adapter 60 receives a XFER_RDY response from the storage device of the designated LUN. In block B316, the target adapter 60 receives the data for the write command from the initiator adapter 14.

In block B318, the target adapter 60 sends the data to the target controller via a DMA operation, sends a completion response to the initiator 14 and also sends the data to the storage device for the designated LUN. The storage device stores the data at the appropriate location and then in block B320, a completion is sent to the target adapter 60. The process then ends in block B322.

As described above, using the write back flag improves the overall processing of the write command. Needless DMA operations and interrupts are avoided. The target driver 82 can execute faster write operations to virtual LUNs or mirroring storage devices.

Figure 4A:
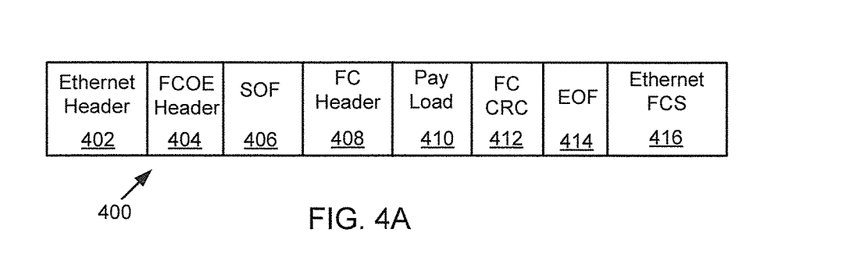
FIGS. 4A-4C show example of frame formats that can be used with the present embodiments.

FIG. 4A shows an example of an FCoE frame (or packet, used interchangeably throughout this specification) format 400 for processing network and storage traffic, according to the present embodiments. The FCoE packet 400 includes an Ethernet header 402. In one embodiment, the Ethernet header 402, which includes the Ethernet type, may be fourteen bytes in length, for example. The Ethernet header may also include optional Tag fields (not shown). The FCoE packet 400 also includes an FCoE header 404 that includes a number of reserved fields. A start of frame (SOF) 406 indicates the beginning of the embedded Fibre Channel frame and may be one byte, for example.

The FCoE packet 400 may also include a Fibre Channel header (FC Header) 408 that may be 24 bytes long with a payload 410. The payload 410 is also referred to herein as the data for a frame. The Fibre Channel cyclic redundancy code (CRC) 412 may be 4 bytes and the Fibre Channel end of frame (EOF) 414 may be 1 byte in size. The EOF 414 indicates the end of the embedded Fibre Channel frame. The Ethernet FCS 416 is inserted after the Fibre Channel EOF 414. The EOF may be referred to herein as a trailer.

Figure 4B:
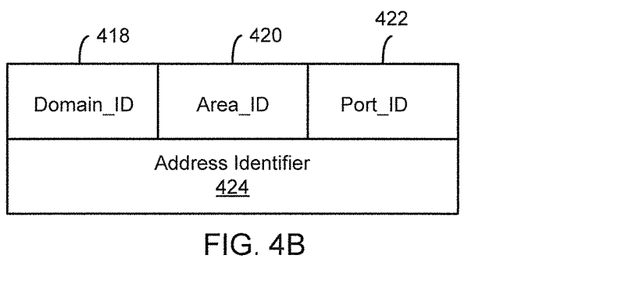

FIG. 4B shows a standard 24-bit Fibre Channel address identifier 424. The address identifier 424 includes a Domain_ID 418, an Area_ID 420, and a Port_ID 422. The Domain_ID 418 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 420 is an Area identifier based on the middle 8 bits of the 24-bit Fibre Channel address. The Area_ID 420 applies either to (a) one or more N_Ports within and attached to a Fibre Channel switch, or (b) to an Arbitrated Loop of NL_Ports attached to a single FL_Port.

The Port_ID 422 is the lower 8-bits of a Fibre Channel address. The Port_ID 422 applies to both (a) a single N_Port and virtualized N_Port within a Domain/Area and (b) the valid AL_PA of a single NL_Port or FL_Port on an Arbitrated Loop.

Figure 4C:
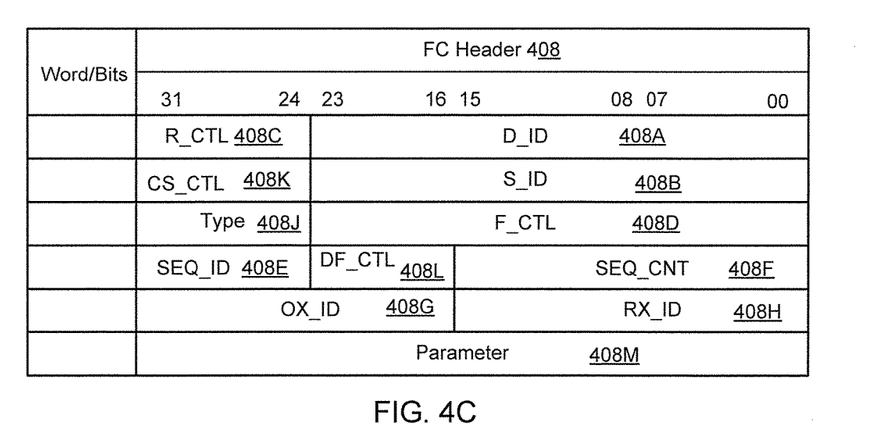

FIG. 4C shows an example of the FC header 408 of FIG. 4A. The following frame header fields that may be used in the present methods are:

D_ID 408A—A 24-bit Fibre Channel frame header field that contains the destination address for a frame.

S_ID 408B—A 24-bit Fibre Channel frame header field that contains the source address for a frame.

R_CTL 408C—A routing control flag in a Fibre Channel header.

F_CTL 408D—A frame control flag.

SEQ_ID 408E—Provides a sequence number for a frame of an exchange.

SEQ_CNT 408F—Provides the number of frames that have been transmitted in a sequence.

OX_ID 408G: This is an originator exchange identifier that is assigned by an initiator.

RX_ID 408H—This is an exchange identifier that is generated by a target.

CS_CTL 408K—This bit is used to provide quality of service.

Type 408J—This field is used to indicate a payload. For example, a value of 0x08 indicates a SCSI-FCP payload.

DF_CTL 408L—This field is used to indicate presence of optional headers and their size.

Parameter 408M—This is typically used to provide a relative offset in a sequence.

It is noteworthy that although the embodiments described above are based on initiator and target adapters, the adaptive embodiments can be used by any network device, for example, a switch port or other similar devices.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for writing data at a storage device, comprising:
   receiving a write command from an initiator adapter coupled to a host system by a first peripheral link at a target adapter, interfacing with a target controller by a second peripheral link, for writing data to the storage device; wherein the target controller is a computing device that manages the storage device, and wherein the write command from the initiator adapter is received at the target adapter using a network connection and includes information regarding a virtual logical unit number (LUN) for writing data in response to the write command;
   notifying a target driver by the target adapter to accept the write command from the initiator adapter, the target driver executed by the target controller;
   in response to the notification, mapping LUN information by the target driver to identify a physical LUN for storing the data at the storage device in response to the write command, the target driver using a data structure stored at the target adapter to perform the mapping;
   notifying the target adapter by the target driver to process the write command and providing to the target adapter by the target driver, information regarding the physical LUN and a write back flag;
   sending by the target adapter, via the network connection, a response to the initiator adapter indicating that the target adapter is ready to receive data for the write command and in response to the write back flag, simultaneously issuing a write command for the physical LUN to the storage device before any data is received from the initiator adapter for the write command sent by the initiator adapter to the target adapter;
   receiving data from the initiator adapter for the write command at the target adapter and an indicator from the storage device that the storage device is ready to write the data to the physical LUN;
   transferring the received data from the initiator adapter to a memory of the target controller via a direct memory access (DMA) operation and simultaneously also sending the data to the storage device for the physical LUN in response to the indicator received from the storage device; and
   sending via the network connection, a completion message to the initiator adapter by the target adapter, before receiving any completion message from the storage device that writes the data.

2. The method of claim 1, wherein the write command is a small computer systems interface (SCSI) command sent using a Fibre Channel protocol.

3. The method of claim 1, wherein the write command is a small computer systems interface (SCSI) command sent using a Fibre Channel over Ethernet protocol.

4. The method of claim 1, wherein the initiator adapter is a Fibre Channel over Ethernet converged adapter.

5. The method of claim 1, wherein the target adapter is a Fibre Channel over Ethernet converged adapter.

6. The method of claim 1, wherein the initiator adapter is a Fibre Channel adapter.

7. The method of claim 1, wherein the target adapter is a Fibre Channel adapter.

8. A system comprising:
   a host computing system coupled to an initiator adapter by a first peripheral link; and
   a target adapter using a second peripheral link for interfacing with a target controller for writing data to a storage device, the target controller executing a target driver and the initiator adapter and the target adapter communicating via a network connection; wherein the target controller is a computing device that manages the storage device;
   wherein the target adapter receives a write command from the initiator adapter via the network connection for writing data to the storage device, where the write command includes information regarding a virtual logical unit number (LUN) for writing data in response to the write command, and wherein the target adapter notifies the target driver to accept the write command from the initiator adapter;
   wherein the target driver, in response to the notification, uses a data structure at the target adapter maps LUN information to identify a physical LUN for storing the data at the storage device in response to the write command; and notifies the target adapter to process the write command with information regarding the physical LUN and a write back flag; and
   wherein the target adapter:
      sends a response to the initiator adapter via the network connection that the target adapter is ready to receive data for the write command and in response to the write back flag, simultaneously issues a write command for the physical LUN to the storage device before any data is received from the initiator adapter for the write command sent by the initiator adapter;
      receives data from the initiator adapter for the write command and an indicator from the storage device that the storage device is ready to write the data to the physical LUN;
      transfers the received data from the initiator adapter to a memory of the target controller via a direct memory access (DMA) operation and simultaneously also sends the data to the storage device for the physical LUN in response to the indicator received from the storage device; and sends via the network connection, a completion message to the initiator adapter before receiving any completion message from the storage device that writes the data.

9. The system of claim 8, wherein the write command is a small computer systems interface (SCSI) command sent using a Fibre Channel protocol.

10. The system of claim 8, wherein the write command is a small computer systems interface (SCSI) command sent using a Fibre Channel over Ethernet protocol.

11. The system of claim 8, wherein the initiator adapter is a Fibre Channel over Ethernet converged adapter or a Fibre Channel adapter.

12. The system of claim 8, wherein the target adapter is a Fibre Channel over Ethernet converged adapter or a Fibre Channel adapter.

13. A non-transitory machine readable storage medium having stored thereon instructions for performing a method for writing data at a storage device, comprising machine executable code which when executed by at least one machine, causes the machine to:

receive a write command from an initiator adapter coupled to a host system by a first peripheral link at a target adapter, interfacing with a target controller by a second peripheral link, for writing data to the storage device; wherein the target controller is a computing device that manages the storage device, and wherein the write command from the initiator adapter is received at the target adapter using a network connection and includes information regarding a virtual logical unit number (LUN) for writing data in response to the write command;

notify a target driver by the target adapter to accept the write command from the initiator adapter, the target driver executed by the target controller;

in response to the notification, map LUN information by the target driver to identify a physical LUN for storing the data at the storage device in response to the write command, the target driver using a data structure stored at the target adapter to perform the mapping;

notify the target adapter by the target driver to process the write command and provide to the target adapter by the target driver, information regarding the physical LUN and a write back flag;

send by the target adapter, via the network connection, a response to the initiator adapter indicating that the target adapter is ready to receive data for the write command and in response to the write back flag, simultaneously issue a write command for the physical LUN to the storage device before any data is received from the initiator adapter for the write command sent by the initiator adapter to the target adapter;

receive data from the initiator adapter for the write command at the target adapter and an indicator from the storage device that the storage device is ready to write the data to the physical LUN;

transfer the received data from the initiator adapter to a memory of the target controller via a direct memory access (DMA) operation and simultaneously also send the data to the storage device for the physical LUN in response to the indicator received from the storage device; and send, via the network connection, a completion message to the initiator adapter by the target adapter before receiving any completion message from the storage device that writes the data.

14. The non-transitory machine readable storage medium of claim 13, wherein the write command is a small computer systems interface (SCSI) command sent using a Fibre Channel protocol.

15. The non-transitory machine readable storage medium of claim 13, wherein the write command is a small computer systems interface (SCSI) command sent using a Fibre Channel over Ethernet protocol.

16. The non-transitory machine readable storage medium of claim 13, wherein the initiator adapter is a Fibre Channel over Ethernet converged adapter.

17. The non-transitory machine readable storage medium of claim 13, wherein the target adapter is a Fibre Channel over Ethernet converged adapter.

18. The non-transitory machine readable storage medium of claim 13, wherein the initiator adapter is a Fibre Channel adapter.

19. The non-transitory machine readable storage medium of claim 13 wherein the target adapter is a Fibre Channel adapter.

* * * * *